(12) United States Patent
Dragich

(10) Patent No.: US 10,220,977 B2
(45) Date of Patent: Mar. 5, 2019

(54) PROTECTIVE DEVICE FOR KITCHEN FLOORING

(71) Applicant: Miodrag Dragich, Raleigh, NC (US)

(72) Inventor: Miodrag Dragich, Raleigh, NC (US)

( * ) Notice: Subject to any disclaimer, the term of this patent is extended or adjusted under 35 U.S.C. 154(b) by 0 days.

(21) Appl. No.: 15/663,213

(22) Filed: Jul. 28, 2017

(65) Prior Publication Data

US 2018/0099776 A1  Apr. 12, 2018

Related U.S. Application Data

(60) Provisional application No. 62/406,179, filed on Oct. 10, 2016.

(51) Int. Cl.

| | |
|---|---|
| *B65D 6/02* | (2006.01) |
| *B65D 6/04* | (2006.01) |
| *B65D 6/08* | (2006.01) |
| *B65D 6/26* | (2006.01) |
| *A47G 27/02* | (2006.01) |
| *A47J 47/16* | (2006.01) |
| *E04F 15/06* | (2006.01) |

(52) U.S. Cl.
CPC ............ *B65D 7/08* (2013.01); *A47G 27/0206* (2013.01); *A47J 47/16* (2013.01); *B65D 7/14* (2013.01); *B65D 7/30* (2013.01); *E04F 15/06* (2013.01); *B65D 2313/10* (2013.01)

(58) Field of Classification Search
CPC ........ B65D 7/08; B65D 7/30; A47G 27/0206; A47B 95/002; A47B 95/0043; A47B 95/00

See application file for complete search history.

(56) References Cited

U.S. PATENT DOCUMENTS

| | | | | |
|---|---|---|---|---|
| 2,801,766 | A * | 8/1957 | Bishop | B65D 7/08 220/495.01 |
| 4,903,723 | A * | 2/1990 | Sublett | A47L 15/421 137/312 |
| 5,299,330 | A * | 4/1994 | Moore | A47K 3/16 4/604 |
| 5,577,539 | A * | 11/1996 | Shaw | B67C 11/02 141/106 |
| 6,941,703 | B2 * | 9/2005 | MacLean | A01K 1/0103 137/312 |
| 7,316,834 | B2 * | 1/2008 | Hernandez | E04H 6/428 180/69.1 |
| 8,905,057 | B2 * | 12/2014 | Sass | A47L 15/4212 137/15.11 |
| 2005/0106361 | A1 * | 5/2005 | Clark | A47G 27/0206 428/192 |

(Continued)

*Primary Examiner* — Paola Agudelo

(57) ABSTRACT

A protective device that can be used to protect kitchen flooring from being damaged consists of a base section, a backsplash section, and a sidesplash section. The food preparation equipment, such as a deep fryer or pressure fryer, is placed on the base section. The backsplash and the sidesplash are used to attach the device to a wall adjacent to the food preparation area. A tapered portion of the base section allows food preparation equipment to be conveniently placed on the base section and rolled away from the base section when needed. The ability to move the food preparation equipment is beneficial to clean the floor area in which the food preparation equipment is used in and protect the floor area.

5 Claims, 7 Drawing Sheets

(56) References Cited

U.S. PATENT DOCUMENTS

| | | | | |
|---|---|---|---|---|
| 2009/0107874 A1* | 4/2009 | Wolfe | ................ | A47L 15/4212 |
| | | | | 206/557 |
| 2013/0081339 A1* | 4/2013 | Kreyling | ............ | A47G 27/0206 |
| | | | | 52/177 |
| 2017/0265688 A1* | 9/2017 | Singh | ................... | A47J 47/005 |

* cited by examiner

PROTECTIVE DEVICE FOR KITCHEN FLOORING

The current application claims a priority to the U.S. Provisional Patent application Ser. No. 62/406,179 filed on Oct. 10, 2016.

FIELD OF THE INVENTION

The present invention relates generally to a protective device for kitchen flooring. More specifically, the present invention is a device that can be used to for protecting and maintaining floor surface area that is being used for food preparation.

BACKGROUND OF THE INVENTION

Pressure fryers and deep fryers are among some of the considerably large equipment used in the restaurant industry. When such equipment is used for a lengthy time period, the floor that holds the equipment can be damaged. As a result, the restaurant owner or other individual needs to undergo the task of repairing the damaged floor. Such repairs can be financially disadvantageous and time consuming which is hurtful in the industry.

A majority of restaurant equipment uses oil for cooking purposes. When the floor that holds these equipment is damaged, the risk of oil spill increases. Such oil spills can result in injury to staff or damage to property. Thus, broken floors can lead to a dangerous work environment.

Generally, restaurant staff roll away equipment used for food preparation so that the floor area surrounding the equipment can be cleaned. However, when the floor area is damaged or uneven, restaurant staff can be reluctant to roll away the equipment and clean the area. When such practices continue for a considerable time, moisture and bacteria lead to a breeding ground for mold and germs.

The objective of the present invention is to address the aforementioned issues. In particular, the present invention introduces an apparatus that can be used to protect and maintain the floor area in which food preparation equipment is used in. More specifically, the floor area that holds a pressure fryer, a deep fryer or other comparable food preparation device can be protected from damage by utilizing the present invention.

DETAIL DESCRIPTIONS OF THE INVENTION

All illustrations of the drawings are for the purpose of describing selected versions of the present invention and are not intended to limit the scope of the present invention.

The present invention introduces a protective device to be used on restaurant floors. More specifically, the present invention is intended to be used as a platform for equipment such as pressure fryers and deep fryers. By utilizing the present invention, workplace hazards, property damage, and maintenance related financial loss can be avoided.

Figure 1:
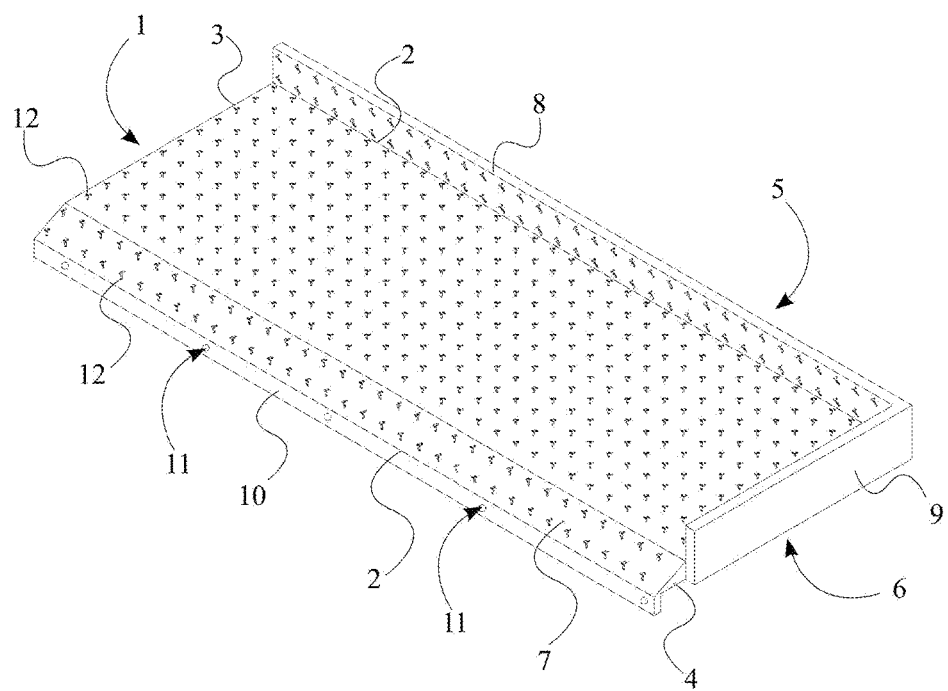
FIG. 1 is a perspective view of the present invention.

As seen in FIG. 1, to protect the floor area in which food preparation equipment is used in, the present invention comprises of a base section 1, a backsplash section 5, and a sidesplash section 6. When the present invention is being used, the food preparation equipment is placed on the base section 1 which has a rectangular surface area. To cater a wide variety of food preparation equipment, the base section 1 varies in size in different embodiments of the present invention. The backsplash section 5 and the sidesplash section 6 are used to attach the present invention to a wall which is adjacent to the floor area the present invention is used on.

Figure 2:
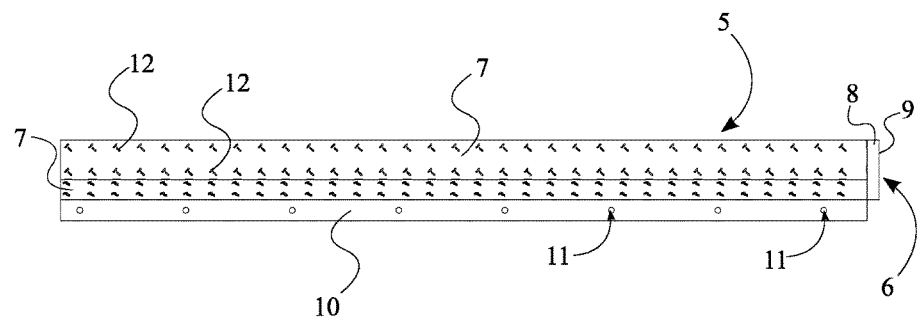
FIG. 2 is a front view of the present invention.
Figure 4:
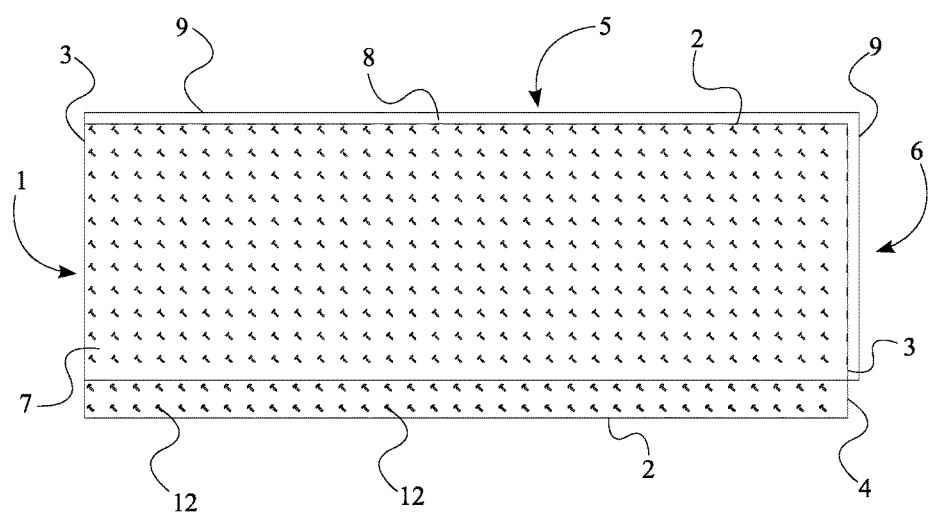
FIG. 4 is a top view of the present invention.
Figure 6:
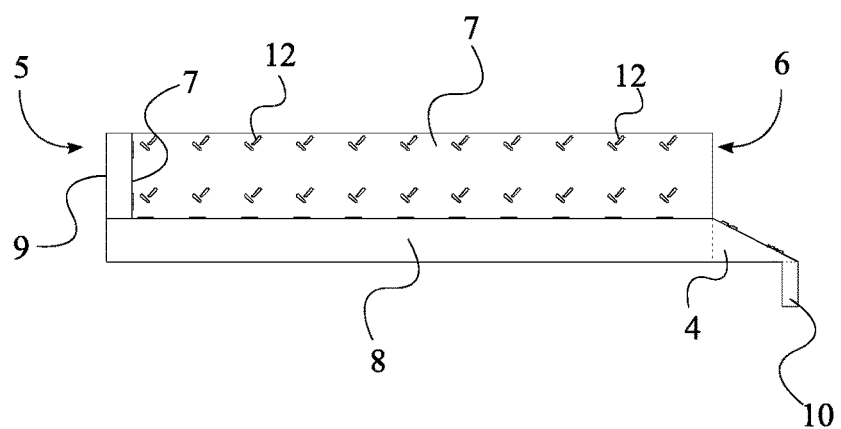
FIG. 6 is a side view of the present invention.

As seen in FIG. 2, FIG. 4, and FIG. 6, the base section 1, the backsplash section 5, and the sidesplash section 6 each comprises a receiving surface 7, a structural body 8, and an attaching surface 9. The attaching surface 9 is used to position and secure the present invention in the intended position. The receiving surface 7 and the attaching surface 9 are attached opposite to each other across the structural body 8. Therefore, when appropriately attached at the receiving surface 7, only the receiving surface 7 is visible. The structural body 8 provides structural strength to the present invention. In the preferred embodiment of the present invention, the structural body 8 is made of diamond plate aluminum. However, in other embodiments of the present invention, different metals can be used to construct the structural body 8 as long the present invention has sufficient structural strength.

As shown in FIG. 4, when considering the base section 1, the structural body 8 of the base section 1 further comprises a pair of lengthwise edges 2 and a pair of widthwise edges 3. As discussed earlier, the dimensions for the pair of lengthwise edges 2 and the dimensions for the pair of widthwise edge 3 can vary from one embodiment to another. When the attaching surface 9 of the base section 1 is in contact with the floor area, the backsplash section 5 and the sidesplash section 6 need to be in contact with the wall. To do so, the backsplash section 5 is perpendicularly connected along one of the pair of lengthwise edges 2. On the other hand, the sidesplash section 6 is perpendicularly connected along one of the pair of widthwise edge 3. The positioning of the backsplash section 5 and the sidesplash section 6 is such that the sidesplash section 6 is oriented perpendicular to the backsplash section 5. The height of the backsplash section 5 and the height of the sidesplash section 6 can vary from one embodiment to another.

Figure 7:
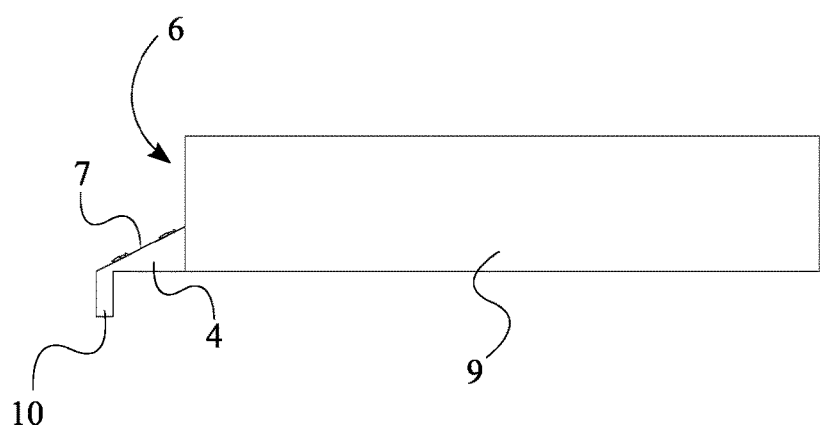
FIG. 7 is another side view of the present invention.

Generally, when the floor area holding food preparation equipment needs to be cleaned, the food preparation equipment is rolled away to a different position. However, if the floor area is uneven due to broken tiles or other comparable reasons, rolling away the food preparation equipment can be time consuming and hazardous. As an example, the probability of an oil spill is high with an uneven floor area or broken tiles. To avoid the issue, the structural body 8 of the base section 1 further comprises a tapered portion 4 as shown in FIG. 6 and FIG. 7. The tapered portion 4 allows the food preparation equipment to smoothly roll away from the receiving surface 7 of the base section 1. To do so, the tapered portion 4 extends inward from one of the pair of lengthwise edges 2 opposite to the backsplash section 5. Thus, any movement that can occur when moving the food preparation equipment from one surface to another is eliminated. Preferably, the tapered portion 4 has an acute angle from the attaching surface 9 to the receiving surface 7 of the base section 1. The acute angle allows the user to conveniently move the food preparation equipment away from the base section 1 and back onto the base section 1.

Figure 3:
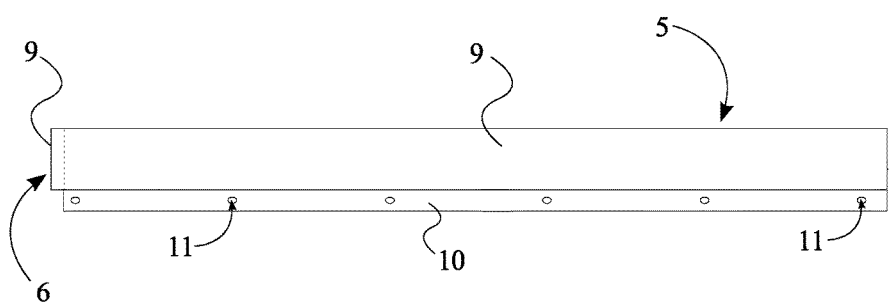
FIG. 3 is a rear view of the present invention.
Figure 5:
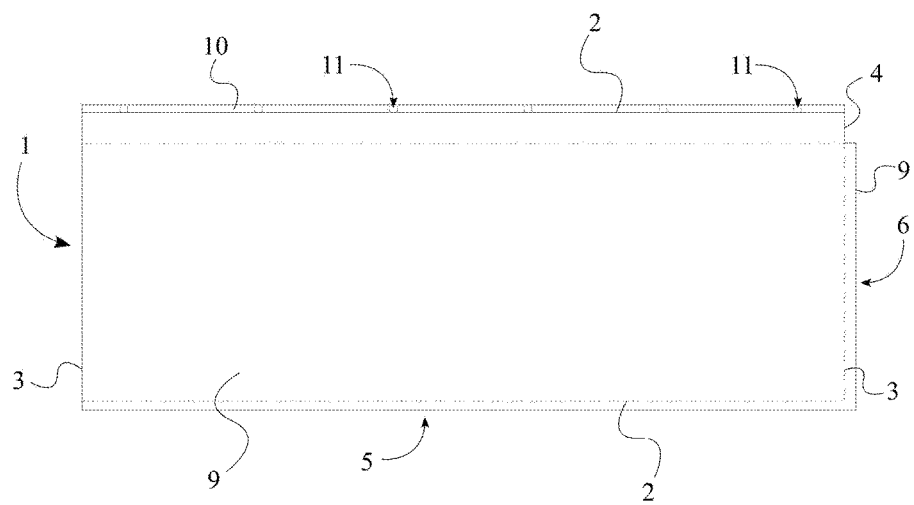
FIG. 5 is a bottom view of the present invention.

As seen in FIGS. 1-3, to secure the present invention against the floor area, the present invention further comprises an anchoring section 10. When considering the positioning, the anchoring section 10 is perpendicularly connected to the tapered portion 4 along one of the pair of lengthwise edges 2 as seen in FIG. 5 and FIG. 6. Thus, the anchoring section 10 is positioned opposite to the backsplash section 5. To be secured to the floor area, the anchoring section 10 extends in a direction opposite to the orientation of the backsplash section 5. Moreover, the present invention further comprises a plurality of receiving holes 11 that is used to secure the anchoring section 10. The plurality of receiving holes 11 perpendicularly traverse through an anchoring body of the anchoring section 10.

As mentioned before, the structural body 8 of the present invention is preferably made of a metallic material. In such instances, if the receiving surface 7 of the base section 1 is smooth, the food preparation equipment can slide about the receiving surface 7. To avoid such issues, the present invention comprises a plurality of gripping protrusions 12 so that the receiving surface 7 is a non-slip surface. As seen in FIG. 1, FIG. 4, and FIG. 6, the plurality of gripping protrusions 12 is distributed about the receiving surface 7 so that the food preparation equipment is placed on a non-slip surface.

When the present invention is being utilized, the following process flow is generally followed. When the preferred area is selected, any existing tile is removed along a turn-down edge. Furthermore, a channel is created to receive the anchoring section 10. Preferably, the channel will be 1.5-inches in depth and 1-inch in width. The anchoring section 10 is positioned into the channel and secured with a fastening mechanism which can be, but is not limited to, epoxy grout. The plurality of receiving holes 11 are used to establish a secure the anchoring section 10 at the channel. As an example, in the preferred embodiment of the present invention, epoxy grout is received by the plurality of receiving holes 11 so that present invention is firmly connected at the anchoring section 10. Next, the attaching surface 9 of the base section 1 is secured to the floor with a fastening mechanism which can be, but is not limited to, epoxy mortar. Similarly, the backsplash section 5 and the sidesplash section 6 are secured against the wall with the use of epoxy mortar, silicone sealant or other comparable method.

Although the invention has been explained in relation to its preferred embodiment, it is to be understood that many other possible modifications and variations can be made without departing from the spirit and scope of the invention as hereinafter claimed.

What is claimed is:

1. A protective device for kitchen flooring comprising:
a base section;
a backsplash section;
a sidesplash section;
an anchoring section;
the base section comprising a base receiving surface, a base structural body and a base attaching surface;
the base structural body being formed in between the base receiving surface and the base attaching surface;
the backsplash section comprising a backsplash receiving surface, a backsplash structural body and a backsplash attaching surface;
the backsplash structural body being formed in between the backsplash receiving surface and the backsplash attaching surface;
the sidesplash section comprising a sidesplash receiving surface, a sidesplash structural body and a sidesplash attaching surface;
the sidesplash structural body being formed in between the sidesplash receiving surface and the sidesplash attaching surface;
the base structural body comprising a tapered portion, a first base lengthwise edge, a second base lengthwise edge, a first base widthwise edge and a second base widthwise edge;
the first base lengthwise edge and the second base lengthwise edge being oppositely positioned to each other across the base structural body;
the first base widthwise edge and the second base widthwise edge being oppositely positioned to each other across the base structural body;
the first base widthwise edge and the second base widthwise edge being located in between the first base lengthwise edge and the second base lengthwise edge;
the backsplash section being perpendicularly connected with the base receiving surface;
the sidesplash section being perpendicularly connected with the base receiving surface;
the backsplash section extending along the first base lengthwise edge;
the sidesplash section extending along the first base widthwise edge;
the backsplash section being erected from the base receiving surface in a first direction;
the sidesplash section being erected from the base receiving surface in the first direction;
the sidesplash section being perpendicularly oriented to the backsplash section;
the tapered portion being formed along the second base lengthwise edge;
the tapered portion being tapered from from the base receiving surface to the base attaching surface;
the tapered portion being tapered from the first base lengthwise edge to the second base lengthwise edge;
the anchoring section being connected with the tapered portion;
the anchoring section extending along the tapered portion; and
the anchoring section being erected from the tapered portion in a second direction opposite to the first direction.

2. The protective device for kitchen flooring as claimed in claim 1, wherein the tapered portion creates an acute angle in between the base receiving surface and the base attaching surface.

3. The protective device for kitchen flooring as claimed in claim 1 comprising:
a plurality of receiving holes; and
the plurality of receiving holes perpendicularly traversing through the anchoring section.

4. The protective device for kitchen flooring as claimed in claim 1 comprising:
a plurality of gripping protrusions; and
the plurality of gripping protrusions being distributed about the base receiving surface, the backsplash receiving surface and the sidesplash receiving surface.

5. The protective device for kitchen flooring as claimed in claim 1, wherein the base structural body, the backsplash structural body and the sidesplash structural body each is made of diamond plate aluminum.

* * * * *